July 9, 1968  L. J. WOLF  3,391,831
DRY SOLIDS FERTILIZER APPLICATOR
Filed Oct. 7, 1966  3 Sheets-Sheet 1

INVENTOR.
LLOYD J. WOLF
BY
Bedell & Burgess
ATTORNEYS

July 9, 1968 L. J. WOLF 3,391,831
DRY SOLIDS FERTILIZER APPLICATOR
Filed Oct. 7, 1966 3 Sheets-Sheet 2
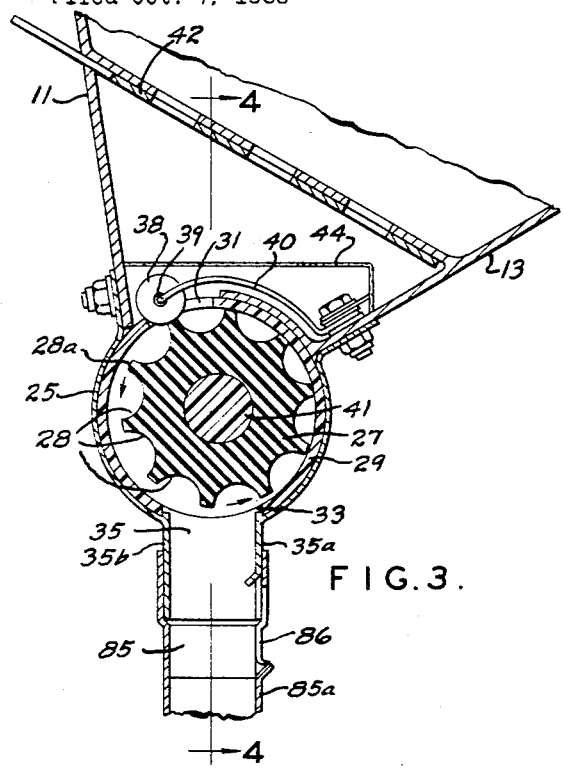
FIG. 3.
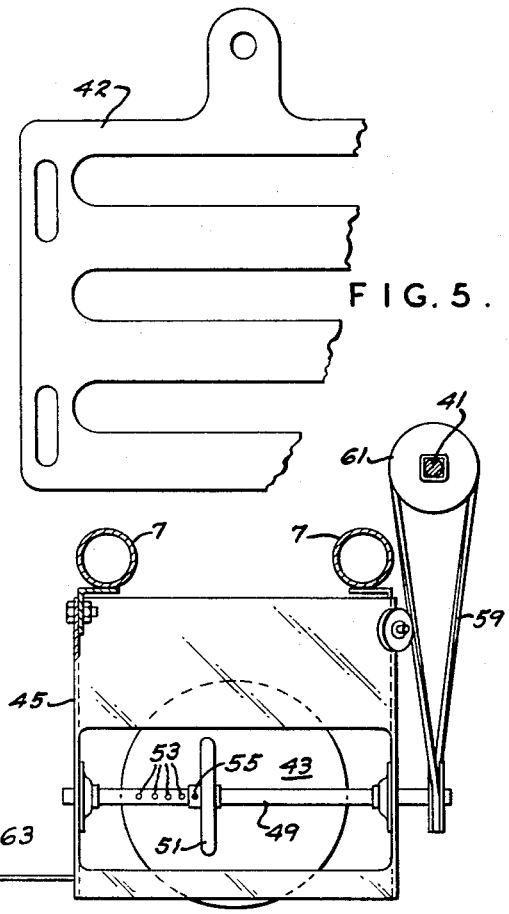
FIG. 5.
FIG. 6.
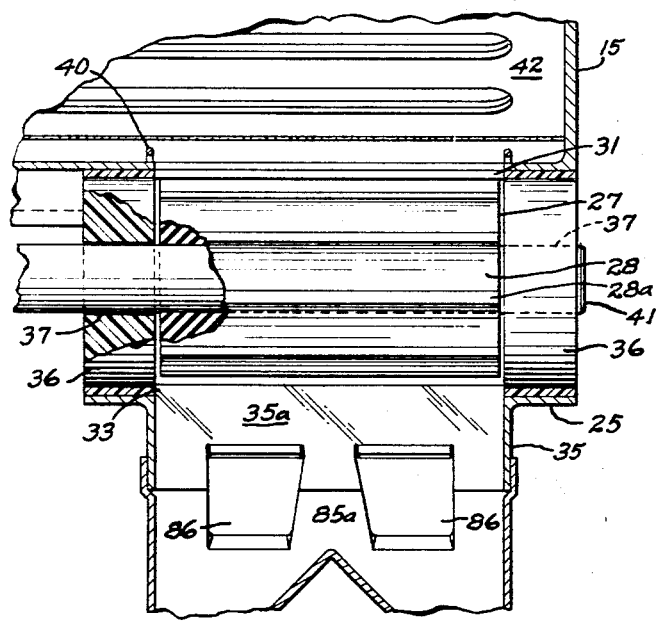
FIG. 4.
INVENTOR.
LLOYD J. WOLF
BY
Bedell & Burgess
ATTORNEYS INVENTOR
LLOYD J. WOLF
BY
Bedell & Burgess
ATTORNEYS

United States Patent Office 3,391,831
Patented July 9, 1968

3,391,831
DRY SOLIDS FERTILIZER APPLICATOR
Lloyd J. Wolf, c/o Lloyd J. Wolf & Son, Inc.,
2425 Irving Blvd., Dallas, Tex. 75207
Continuation-in-part of application Ser. No. 464,325,
June 16, 1965. This application Oct. 7, 1966, Ser.
No. 598,551
16 Claims. (Cl. 222—139)

This application is a continuation-in-part of my copending application Ser. No. 464,325, filed June 16, 1965, now abandoned.

The invention relates to fertilizer applicators and consists particularly in an applicator for dry granular or solids type fertilizers.

Some conventional applicators utilize gates of variable width or perforations to control flow of the fertilizer from the hopper to the distributor. Because such applicators provide no means for varying the rate of flow of the fertilizer with respect to the ground speed of the applicator, the amount of fertilizer delivered per acre varies in inverse proportion to the ground speed of the applicator. For example, if a conventional applicator were operated at 5 m.p.h., it would deliver twice as much fertilizer per acre as if it were operated at 10 m.p.h.

Other fertilizer distributors have utilized rotors driven by a direct connection to the ground wheels to cause the fertilizer to flow at a rate directly proportional to the ground speed of the distributor. While this arrangement corrects the deficiency noted above in constant flow applicators, it does not provide means for selectively varying the rate of flow with respect to ground speed, so that the quantity of fertilizer applied per acre can be varied in accordance with the type of fertilizer, the requirements of the soil, etc.

It accordingly is an object of the invention to provide a dry solids type fertilizer applicator in which the rate of flow of the fertilizer is variably proportional to the ground speed of the applicator. Another object is to provide a fertilizer applicator which is equally suitable for use with large, hard, coarse, irregular materials, as well as with soft, round, slippery materials. A further object is to provide sealing means for the hopper outlet which will prevent the flow, when undesired, of all types of solid fertilizer including small, round, slippery pellets, yet will not interfere with the flow, when desired, of any type of granular fertilizer, including coarse, hard varieties.

The foregoing and additional more detailed objects and advantages are achieved by the fertilizer applicator described hereinafter and illustrated in the accompanying drawings, in which:

FIG. 3 is an enlarged fragmentary vertical sectional view along line 3—3 of FIG. 1.

FIG. 4 is a vertical sectional view along line 4—4 of FIG. 3.

FIG. 5 is a fragmentary plan view of the hopper sliding gate.

FIG. 6 is an enlarged side view of the variable speed drive mechanism for operating the rotors, taken along line 6—6 of FIG. 1.

Figure 1:
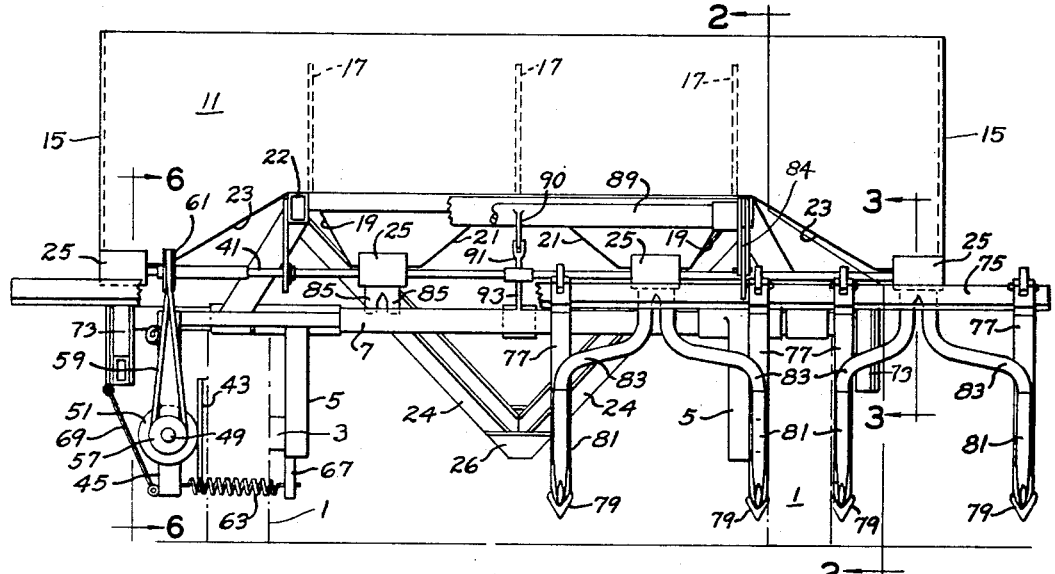
FIG. 1 is a rear end elevation view of a fertilizer applicator embodying the invention, with the left hand portion of the knife bar and associated structure removed.

The applicator comprises a pair of axially-spaced pneumatic-tired ground wheels, rotatably journaled on stub axles 3, which are secured at their inner ends, inboard of the wheels to the apices of V-shaped wheel support frames each comprising a pair of upwardly inclined members 5, 5. At their upper ends side frame members 5, 5 at the opposite sides are rigidly connected to each other by longitudinally spaced tubular transom members 7, 7. At each side, outboard of side frame members 5, 5, front and rear upwardly and transversely inwardly inclined legs 9, 10, are secured to tubular transoms 7, 7 and, through longitudinal frame members 22, support the bottom of a transversely elongated container or bin for dry solid fertilizer having a slightly sloping rear wall, a substantially sloping front wall 13, and vertical side walls 15. Three interior bulkheads divide the bin into four hoppers, having generally pyramidal bottoms formed by downward projections of rear and front walls 11 and 13, side walls 15 and intermediate longitudinally extending transversely sloping walls 19, 19, 21, 21 and 23, 23. Intermediate the side and middle hoppers longitudinal frame members 22 underlie the bottom walls and are inclined forwardly and downwardly. Transversely inwardly and downwardly inclined members 24 are connected at their rear ends to frame members 22 and converge at 26 to form a tow bar for connection to the towing eye of a tractor.

Each of the hoppers has at its apex a cylindrical housing 25 for a metering rotor 27, fluted as at 28, whereby the rate of flow of fertilizer from the hopper is regulated. The cylindrical housings 25 are each provided with a liner 29 of fiberglas tubing, peripherally continuous at its end marginal portions but formed with a rectangular inlet opening 31 in the top of its rear upper quadrant, communicating with the bottom of the hopper and a rectangular outlet opening 33 in its bottom communicating with discharge conduit 35 depending from the bottom of housing 25, the forward and rear walls 35a and 35b of the discharge conduit projecting upwardly into the housing to abut the forward and rear margins of liner outlet opening 33, and thus properly locate the liner in the housing. The ends of liner 29 are closed by cylindrical blocks 36, formed with aligned eccentric holes 37 which form bearings for rotor shaft 41.

Rotors 27, preferably of noncorrosive material, are of substantially less diameter than the liners, and are eccentrically mounted in the housing in close proximity to the top forward quadrant thereof, leaving substantial clearance in the other quadrants. For preventing the admission of fertilizer to the rotor housing when the rotor is stationary, an elongated cylindrical roller element 38, the full length of rotor housing inlet opening 31, is rotatably mounted on the cross member 39 of a U-shaped wire spring, the legs 40 of which are secured to hopper front wall 13 and are curved to bias the roller 38 inwardly radially of the rotor housing, thus maintaining roller 38 in engagement with liner 29 along the rear margin of liner inlet 31 and against the rotor nodes 28a, thus sealing the rotor housing clearance space against undesired admission of fertilizer from the hopper when the rotor is stopped. With this arrangement, as the rotors rotate counterclockwise in their housing, as viewed in FIG. 3, fertilizer drops through inlet opening 31 into successively upwardly exposed flutes 28, and is carried by the flutes past sealing roller 38 into the eccentric clearance space between the rotor and housing liner, and thence by gravity through outlet opening 33 into discharge conduit 35. To permit removal and replacement of rotors without emptying the hoppers, each hopper is provided with a manually operable sliding gate 42 above the outlet. In order to prevent the admission to the rotor housings of oversize lumps of fertilizer which might clog the rotor, a screen 44 separates the inlet opening 31 from the hopper.

Because of the close clearance between rotor 27 and liner 29 in the upper forward quadrant, fertilizer cannot be admitted to that part of the housing, where its effect would be to impede normal counterclockwise rotation of the rotor, and because of the large clearance provided from inlet opening 31 through both rear quadrants, the flow of hard, firm types of fertilizer will not be hindered once it has been moved past sealing roller 38 by the rotor. At the same time, if the rotor stops turning, for any reason, roller 38 will effectively block the passage of any fertilizer from the hopper into the rotor chamber and its consequent waste or excessive application to the ground when a stoppage occurs.

The four rotors 27 are rigidly mounted on a continuous shaft 41, preferably of nylon or similar material having substantial torsional strength with sufficient flexibility whereby to accommodate slight disalignment of the rotors from each other.

To permit selective variation of the speed of the rotors and of the rate of flow of the fertilizer from the hoppers, the applicator includes a variable speed drive comprising a disk 43 concentrically mounted on the exterior of left-hand ground wheel 1, a frame 45 pivotally supported at 47 on a longitudinal axis from transom members 7, 7 outwardly of disk 43, a shaft 49 journaled in frame 45 and extending longitudinally thereof at the same level as the wheel center and mounting a small rubber-tired wheel 51, with its periphery normally held in engagement with the surface of disk 43, and shiftable radially thereof to selected fixed positions defined by spaced holes 53 in the shaft and a registering hole 55 in the hub of wheel 53, so that the speed of shaft 49 varies from a minimum when wheel 51 is closest to the center of disk 43 to a maximum when wheel 51 is at its maximum displacement from the disk center. Shaft 49 projects rearwardly from frame 45 and, at its rear end, rigidly mounts a sheave wheel 57, connected by belt 59 to sheave wheel 61 rigidly mounted on rotor shaft 41. A transversely extending coil spring 63 secured at its outer end to bracket 65 on frame 45, and at its inner end to bracket 67 on side frame 5 normally retains the small wheel 51 in frictional engagement with disk 43.

Figure 2:
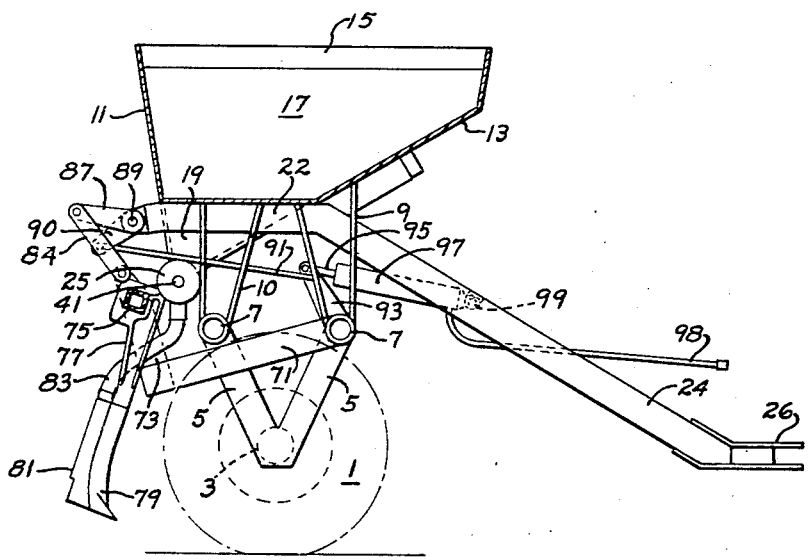
FIG. 2 is a longitudinal vertical sectional view along line 2—2 of FIG. 1.

Outwardly of the wheels at both sides there are L-shaped members comprising long legs 71 journaled at their forward ends on forward tubular transom 7, and short generally upright legs 73 rigidly connected at their upper ends to box section tool bar 75, on which are mounted, on both sides of each hopper outlet, depending soil knife brackets 77, to which are attached soil knives 79. To the rear of knives 79 are secured fertilizer nozzles 81, which are connected by hoses 83 to bifurcated spouts 85 on hopper outlets 35. For lowering the soil knives from the position shown in FIGS. 1 and 2 clear of the ground, to a position extending several inches below the earth line, and for retracting them when desired, upwardly and rearwardly inclined pitmans 84 are pivotally connected at their lower ends to brackets on tool bar 75, and at their upper ends to rearwardly extending cranks 87, on the ends of transverse shaft 89, which is journaled in the projecting rear ends of frame members 22. At its center, shaft 89 rigidly mounts a third crank 90 slightly downwardly inclined rearwardly, which is connected by longitudinally extending rod 91 to an arm 93 pivotally mounted on forward tubular transom 7 and connected to piston rod 95 of the hydraulic cylinder which is pivotally secured at its forward end to the tool bar 75, at 99, and is selectively actuable by the operator to raise and lower the knives. In order to stop the rotors automatically when the knives are raised, a cable 69 is connected at its one end to the bottom of drive frame 45 and at its other end to the adjacent L-shaped members 71, 73, so that when the latter is raised to raise the knives, wheel 51 is disengaged from disk 43. When the knives are lowered, cable 69 permits spring 63 to urge wheel 51 back into driving engagement with disk 43.

In order to prevent fertilizer from backing up from a blocked knife through hoses 83 and into the rotor housings, where it might damage the rotors and the rotor drive, the front wall 85a of each of the bifurcated spouts 85 is provided with a pair of windows 86, through which backed-up fertilizer will spill, rather than clog the rotor housings and will be apparent to the operator, providing a danger warning of the difficulty.

Operation of the applicator is as follows: With tool bar 75 and the soil knives 79 mounted thereon raised to the position shown in FIGS. 1 and 2, and tow bar 24 connected to a tractor towing eye, cylinder 97 connected to a master cylinder on the tractor, the hoppers are filled with fertilizer and the applicator pulled to the field to be fertilized. When this point is reached, hydraulic pressure in cylinder 97 is reduced, permitting arm 93 to rotate clockwise and, through rod 91, permitting crank 90, shaft 89 and crank 87 to rotate counterclockwise so that pitman 84 moves downwardly, permitting L-shaped members 71, 73 to rotate downwardly about forward tubular transom member 7, thus lowering tool bar 75 and with it knives 79 and the nozzles 81 to the desired subsoil position. Tension is thereby removed from cable 69, permitting spring 63 to move frame 45 until small wheel 51 is in frictional engagement with disk 43, the displacement of wheel 51 from the center of the disk having been previously set in accordance with the desired rate of flow of the fertilizer from the hoppers. The applicator is then driven through the acreage to be fertilized and, as the ground wheels rotate disk 43, the latter drives small wheel 51 at a speed proportional to the pre-set displacement of the small wheel from the disk center, wheel 51 rotates shaft 49 and through sheave 57, belt 59 and sheave 61 causes a corresponding rotation of shaft 41 and of rotors 27. Fertilizer passes from the hoppers past sealing rollers 38 to the clearance spaces between rotors 27 and liners 29, at a rate proportional to the speed of rotation of the rotors, and drops by gravity through outlets 33, spouts 86 and hoses 83 to nozzles 81. If any of the nozzles becomes clogged, backed-up fertilizer therefrom will pour out spout windows 86 in sight of the operator, enabling him to stop the operation and correct the condition without damage to the rotor and mechanisms. If, before the fertilizer in the hoppers is used up, it is necessary to move the applicator to another field, hydraulic cylinder 97 can be actuated, rotating crank 93 counterclockwise, and through rod 91 causing clockwise rotation of arm 90, shaft 89 and arm 87, and consequent upward movement of pitman 85, thereby lifting tool bar 75 and knives 79 out of their subsoil position and rotating L-shaped members 71, 73 counterclockwise about transom 7 to the raised position shown in FIGS. 1 and 2, thereby also disengaging variable speed drive take-off wheel 51 from disk 43 by means of cable 69. When the rotors stop, seal rollers 38 block passage of any fertilizer from the hopper into the rotor housing.

Figure 7:
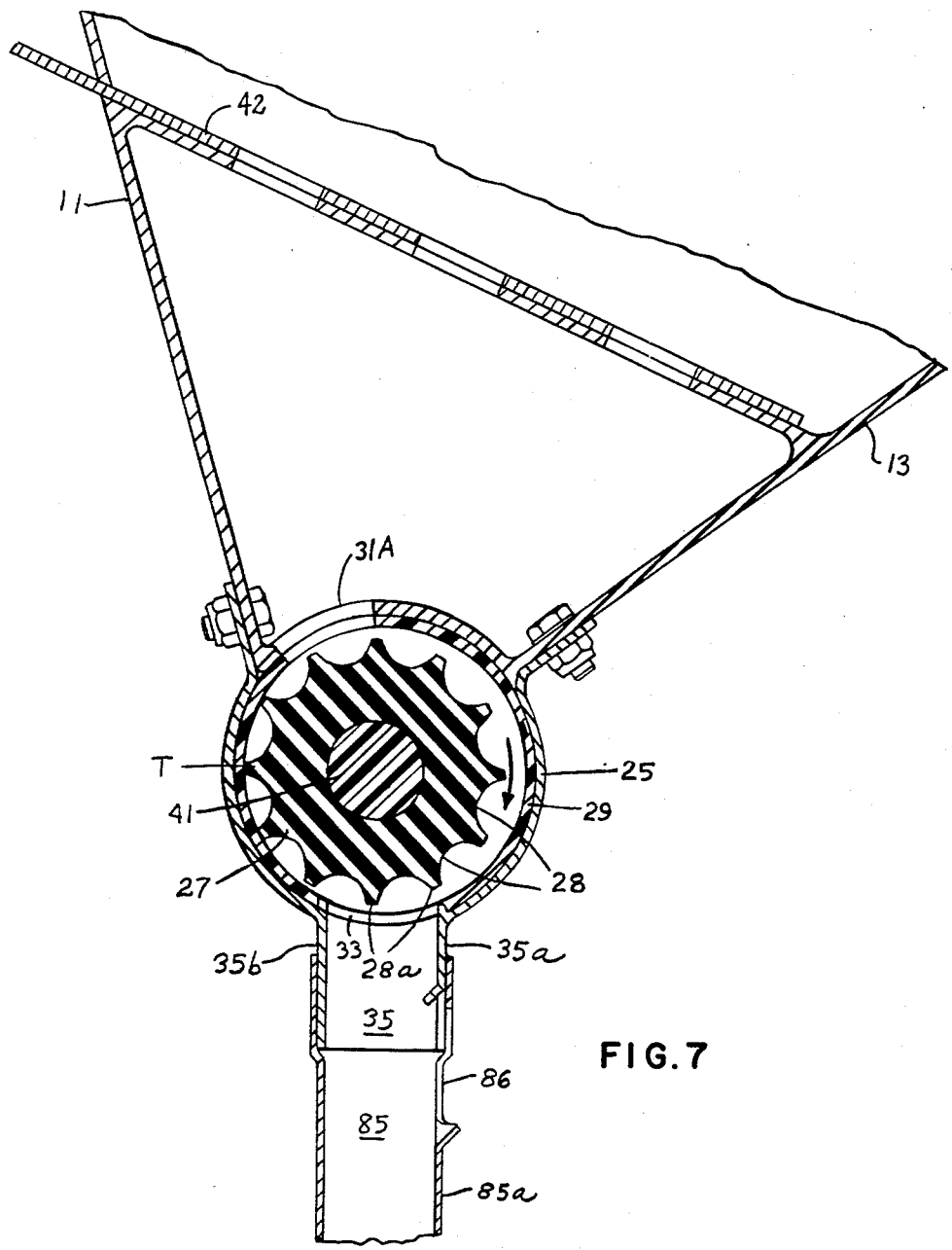
FIG. 7 is an enlarged fragmentary vertical sectional view corresponding to FIG. 3, but illustrating a modification of the invention.

In the improved metering device illustrated in FIG. 7, the axis of rotor shaft 41 is offset horizontally rearwardly (i.e., to the left in FIG. 7) from the axis of rotor housing 25 so that the rotor outer circumference is tangent at T to the inner circumference of the housing at the intersection of the horizontal diameter with the rear (left) side of the housing. With this embodiment, rotor shaft 41 is arranged for clockwise rotation (as indicated by arrow), which is easily effected by reversing the connection of belt 59 to pulley 61. The forward edge of inlet opening 31A is offset slightly rearwardly of the vertical diameter of the rotor and the passageway for fertilizer through the rotor housing is of generally crescent-shaped cross section around the forward surface of the rotor with its upper cusp communicating with rearwardly offset inlet 31A and bottom outlet 35, so that material admitted to the top cusp through inlet 31A can only pass through the housing when the rotor is turning because of inability of the material to flow uphill from inlet opening 31A and over the top of the rotor, and inability of the material to pass the seal formed by the engagement of the rotor with the rear of the housing. When the rotor is turning, however, the fillets 28a separating flutes 28 propel material entering the housing through inlet 31A over the top of the rotor and into the large space formed by the body of the crescent-shaped opening on the forward (right) side of the housing. The large size of this space facilitates the passage of material through this region when the rotor is turning, thus eliminating material pile-up in this region and associated scuffing and abrasive wear on the inner surface of the housing. Because of the self-sealing feature of the device of FIG. 7, additional sealing means such as the sealing roller 38 in the previously disclosed embodiment of FIG. 3 is not required to prevent passage of material through the housing when the rotor is not turning.

The details of the applicator may be modified substantially without departing from the spirit of the invention and the exclusive use of such modifications as come within the scope of the appended claims is contemplated. For example, the disclosed fertilizer metering system may be used advantageously with applicators of the broadcast delivery type as well as with the disclosed subsoil delivery arrangement.

What is claimed is:

1. In a fertilizer applicator, ground wheels, a hopper supported thereon, a transverse horizontally disposed cylindrical housing at the apex of the hopper, a fluted cylindrical rotor of smaller diameter than said housing and eccentrically mounted within said housing with its outer circumference substantially tangential to the inner surface of said housing, a top opening in an upper quadrant of the housing providing communication between said hopper and said housing, a bottom outlet from said housing, the line of tangency of said rotor and housing following said top opening along the direction of rotation of said rotor and being spaced angularly of the housing from both said opening and said outlet whereby to provide a passageway around the rotor connecting said opening and said outlet, and means drivingly connecting said ground wheels and said rotor and including means for varying the speed of the rotor relative to that of said ground wheels.

2. In a fertilizer applicator according to claim 1, an element as long as but narrower than said top opening mounted therein and biased against said rotor and the leading edge of said top opening with respect to the direction of rotation of said rotor.

3. In a fertilizer applicator according to claim 2, said element comprising a roller, there being resilient means mounting said roller on said housing.

4. In a fertilizer applicator according to claim 1, said top opening being disposed entirely rearwardly, with respect to the direction of rotation of said rotor, from a vertical diameter of said rotor whereby material admitted to said housing through said top opening must be moved upwardly over said rotor by rotation of the latter in order to pass through said housing to said bottom outlet.

5. In a fertilizer applicator according to claim 4, the line of tangency of said rotor and said housing being in the region of the horizontal diameter of said housing whereby the space between said rotor and said housing is in the form of a crescent with its upper cusp communicating with said top opening and its lower cusp communicating with said bottom outlet and its body on the opposite side of said vertical diameter from said top opening.

6. In a fertilizer applicator according to claim 1, said outlet having spaced apart forward and rear walls, there being an aperture in the forward wall of said outlet to permit visual inspection of the flow of fertilizer through said outlet and to permit the passage of fertilizer through said aperture if said outlet becomes blocked posterior to said aperture.

7. In a fertilizer applicator according to claim 1, said speed-varying means comprising a disk on one of said ground wheels, a shaft parallel to a diameter of said disk and intersecting the axis of said disk, a wheel mounted on said shaft and selectively shiftable to fixed positions axially thereof and radially of said disk and having its periphery frictionally engageable with the surface thereof, and means for transmitting rotational movement of said shaft to said rotor.

8. In a fertilizer applicator according to claim 7, framing rotatably mounting said shaft and wheel and being pivotally supported from said ground wheels for selective swinging movement toward and away from said ground wheel mounted disk whereby to move said wheel into and out of engagement with said disk.

9. In a fertilizer applicator according to claim 8, resilient means biasing said framing toward said disk-mounting ground wheel.

10. In a fertilizer applicator according to claim 1, a plurality of said hoppers and of said cylindrical housings and rotors, said rotors being substantially aligned with each other axially, said driving means comprising a single shaft drivingly connected to each rotor, said shaft being of transversely flexible and torsionally stiff material.

11. A metering device for granular material comprising a horizontal cylindrical housing, a fluted rotor of smaller diameter than said housing eccentrically mounted within said housing with its outer circumference substantially tangential to the inner surface of said housing, an inlet opening in an upper quadrant of said housing, a bottom opening in said housing, the line of tangency of said rotor and said housing following said inlet opening with respect to the direction of rotation of said rotor and being spaced angularly of the housing from both said openings whereby to form a passageway around said rotor connecting said openings.

12. A metering device according to claim 11, including an element, as long as but narrower than said inlet opening, mounted therein and biased against the leading edge of said inlet opening with respect to the direction of rotation of said rotor.

13. A metering device according to claim 12 in which said element comprises a roller, there being resilient means mounting said roller on said housing.

14. A metering device according to claim 11, in which said inlet opening is disposed entirely rearwardly, with respect to the direction of rotation of said rotor, from a vertical diameter of said rotor whereby material admitted to said housing through said inlet opening must be moved upwardly over said rotor by rotation of the latter in order to pass through said housing to said bottom opening therein.

15. A metering device according to claim 14, in which the line of tangency of said rotor and housing lies in the region of the horizontal diameter of said housing whereby the space between said rotor and housing is in the form of a crescent with its upper cusp communicating with said inlet opening and its lower cusp communicating with said bottom opening and its body on the opposite side of said vertical diameter from said inlet opening.

16. A metering device according to claim 11, in which a conduit having spaced apart forward and rear walls depends from said bottom opening, there being an aperture in the forward wall of said conduit to permit visual inspection of the flow of granular material through said conduit and to permit the passage of material through said aperture if said conduit becomes blocked posterior to said aperture.

References Cited

UNITED STATES PATENTS

| | | | |
|---|---|---|---|
| 30,685 | 11/1860 | Moore | 222—414 |
| 254,957 | 3/1882 | Grow | 222—414 X |
| 266,805 | 10/1882 | Getz | 222—159 |
| 636,683 | 11/1899 | Moussette | 222—368 X |
| 937,623 | 10/1909 | Manning | 222—368 X |
| 1,233,205 | 7/1917 | Dye | 222—349 |
| 2,668,638 | 2/1954 | Joy | 222—139 |
| 3,128,921 | 4/1964 | Henderson | 222—177 X |
| 3,172,574 | 3/1965 | Hiler et al. | 222—177 |

ROBERT B. REEVES, *Primary Examiner.*

K. N. LEIMER, *Assistant Examiner.*